Jan. 25, 1927.  1,615,261
H. M. EDMUNDS
MACHINE FOR PRODUCING THREE DIMENSIONAL FIGURES FROM TWO
DIMENSIONAL RECORDS OF THE SAME
Filed Jan. 17, 1923   5 Sheets-Sheet 1

Fig:1.

Howard M. Edmunds, Inventor
By Frederick S. Duncan Attorney

Jan. 25, 1927.   1,615,261
H. M. EDMUNDS
MACHINE FOR PRODUCING THREE DIMENSIONAL FIGURES FROM TWO
DIMENSIONAL RECORDS OF THE SAME
Filed Jan. 17, 1923   5 Sheets-Sheet 3

Howard M. Edmunds
Inventor
By Frederick S. Duncan
Attorney

Jan. 25, 1927.  1,615,261
H. M. EDMUNDS
MACHINE FOR PRODUCING THREE DIMENSIONAL FIGURES FROM TWO
DIMENSIONAL RECORDS OF THE SAME
Filed Jan. 17, 1923     5 Sheets-Sheet 5

Howard M. Edmunds
Inventor
By Frederick S. Duncan
Attorney

Patented Jan. 25, 1927.

1,615,261

UNITED STATES PATENT OFFICE.

HOWARD M. EDMUNDS, OF BRIGHTON, ENGLAND.

MACHINE FOR PRODUCING THREE DIMENSIONAL FIGURES FROM TWO DIMENSIONAL RECORDS OF THE SAME.

Application filed January 17, 1923, Serial No. 613,243, and in Great Britain January 18, 1922.

The method disclosed in my Patent No. 1,485,493 issued March 4, 1924, is used for certain steps in the method claimed herein.

In my application filed of even date herewith entitled "Guide plates for reproducing three dimensional figures and apparatus for and process of making the same", I describe a plate of a suitable type for use in connection with the present invention and an apparatus and process for making said plate. For the sake of a clear understanding of the operation of the machine of the present invention, I will briefly summarize the description of the plate, process and apparatus described in the above-mentioned application.

The preferred form of apparatus for making this plate as described in the above-mentioned application consists of a light projector of any convenient type which is adapted for the insertion of a grid whereby there may be projected a similar grid on an object to be reproduced and a screen against which the object is set in relief. A camera, and if desired two cameras are so placed with reference to the projector that preferably the incident nodal points of the lenses of the cameras and the emergent nodal point of the projector lens are in an imaginary straight line joining them, this line being parallel to the screen or an assumed plane of relief, the axes of the lenses of the projector and camera or cameras, as the case may be, being preferably normal to the screen. When two cameras are used they are placed one on either side of the projector and equidistant therefrom. The advantages of using two cameras are fully set forth in the above-mentioned application and need not be referred to here, altho it is to be explained that my invention is not by any means limited in its scope to a machine for using two cameras.

The apparatus being preferably set up according to the arrangement described in the foregoing paragraph, the object to be reproduced is placed in relief against the screen, the beam of light is thrown by the projector thereon and a picture of the object, also of the exposed portions of the screen if desired, is taken by the camera. The result is a negative on which is defined a series of lines defining with respect to known or ascertainable parallel straight lines on the negative the contour of the object to be reproduced.

For convenience of description the lines defining the contour of the object may be termed "contour lines" and the known or ascertainable parallel straight lines may be termed "base lines". Any point in a contour line may be conveniently termed a "contour point".

As I have stated in my application abovementioned, I prefer the use of a grid, the lines of which are parallel and uniformly spaced. These particular limitations, however, are imposed more for the purpose of simplifying the construction of the machine which is to do the reproducing than for any other purpose. Under some circumstances it might be unnecessary that the lines covering one area of the object to be reproduced should be as close together as the lines covering another area. Ordinarily, the more irregular the surface to be reproduced the closer the lines should be. In the case of surfaces which vary in regularity of contour it is quite conceivable that it would be unnecessary that the lines be as close together on the more regular surfaces as on the less regular surfaces. As to the parallelism of the lines, this is distinctly desirable for utilizing the plate in the machine as it much simplifies the construction and mechanical motions necessary.

One object of my invention is to provide a machine for producing the three dimensional figures recorded on the two dimensional records of the same above referred to.

Another object is to provide a machine of this character adapted for accurate reproduction of the surfaces defined on these records.

Another object is the production of a machine for utilizing a plurality of co-ordinated guide plates at the same time.

Other objects will appear in the following disclosure of the specific means which I here show and describe as an embodiment of the invention.

Referring to the drawings:

Figure 1 is a diagrammatic plan view of a pair of complementary guide plates suitable for use in the machine.

In Figure 1 I show diagrammatically a pair of guide plates indicated respectively by the letters A and B which are suitable for use in the machine. These particular guide plates may be considered to be merely photographic negatives, altho they may be positives if desired, or copies or reproductions of the negatives such as etchings on copper or otherwise. It is to be observed that these negatives exhibit a series of lines which correspond to the lines of the transparent grid which is projected upon the object, the straight portions 1 of these lines being those portions which fall upon the exposed portion of the screen and the irregular portions 2 of these lines indicating the apparent displacement of the object at varying elevations as recorded on the negatives. It is also to be observed that the irregular portions of the lines in negative A are displaced to the right, while the irregular portions of the lines of negative B are displaced to the left. Negative A is therefore the negative taken by a camera placed at the left of the projector, while negative B is the negative of the camera placed at the right of the projector. The contour point of any given point on the object shows an apparent displacement on each plate exactly the same in extent altho in opposite directions from the base lines. This is due to the principle explained in my above-mentioned application, namely, that when the apparatus is arranged in its preferred form above described, the extent of displacement of any given point is exactly the same in extent on both negatives whether or not it be in the same direction. It should be repeated, however, that it is necessary to invoke this principle only when two negatives are to be used. When one negative is used a considerable departure from the preferred arrangement of the units of the apparatus may be indulged in without seriously affecting the accuracy of the resulting reproduction. In some cases, however, as has also been stated in my application above mentioned, it is difficult, if not impossible, to record the entire surface of an object on a single camera, so, therefore, I prefer to describe an embodiment of my invention in its more useful form, that is, in a form adapted to utilize complementary plates as shown in Figure 1.

The machine for utilizing the guide plate is usually of fixed design and is made capable of a step by step motion, each step of which is equal to the distance between the base lines of the guide plate. Therefore the guide plate must be of proper proportions for use in the machine and the base lines, whether real or imaginary, must be a distance apart suited to the particular machine on which these plates are to be used. It is not, however, ordinarily convenient to obtain a negative of suitable dimensions for use in the machine and it is consequently necessary to increase or decrease the dimensions of the guide plate to accommodate it to the machine. For this purpose lines 3 are provided on the transparency which in common with the vertical lines are projected on the figure and recorded on the negative. These lines are parallel to the imaginary line joining the emergent nodal point of the projector lens with the incident nodal point of the camera lens and therefore appear straight on the camera negatives. As their distance apart bears a fixed proportion to the distance apart of the base lines, they accordingly serve as means whereby a guide plate of proper size may be made with base lines properly spaced for use in the machine; that is to say, it is known by measurement or otherwise that a plate having horizontal lines of a certain fixed distance apart is necessary for use in the machine. The negative can therefore be accordingly enlarged or reduced, as required in the particular case.

This feature is the more important when the process is carried out without the use of a screen. While I have frequently mentioned the use of a screen in carrying out the process, it must be understood that the contour lines may define the contour of the object with respect to any hypothetical plane of relief, and that an actual screen is not necessary. It is sufficient if the position of the plane of relief be known or ascertained in any convenient manner in order to adjust the plate to the step by step mechanism of the machine. This can be conveniently and accurately done by means of the horizontal lines above mentioned, from the actual spacing of which on the negative may be determined the necessary extent of enlargement or reduction in the guide plate. In other words the negative is merely enlarged or reduced so that the horizontal lines are a fixed distance apart, this distance corresponding to a known quantity which bears such relation to the desired spacing of the base lines as to make the guide plate suitable for use in the machine. Of course it is to be understood that if desired the apparatus may be so adjusted and calibrated that a negative of proper dimensions for use in the machine may be produced directly in the camera. This last mentioned method is, however, somewhat inconvenient, and I prefer to produce a negative of convenient size and enlarge or reduce it as required, utilizing the indicating lines to assist me in so doing.

It should also be noted that it is necessary to show these plates diagrammatically for the reason that in actual practice the lines are much closer together than could be conveniently illustrated in a drawing, the spacing in some cases ranging from one-fiftieth to one-two hundredth of an inch. The actual spacing, however, is a matter of choice on the part of the operator having in view the nature of the surface to be reproduced and the accuracy and finish of the carving.

Figure 2:
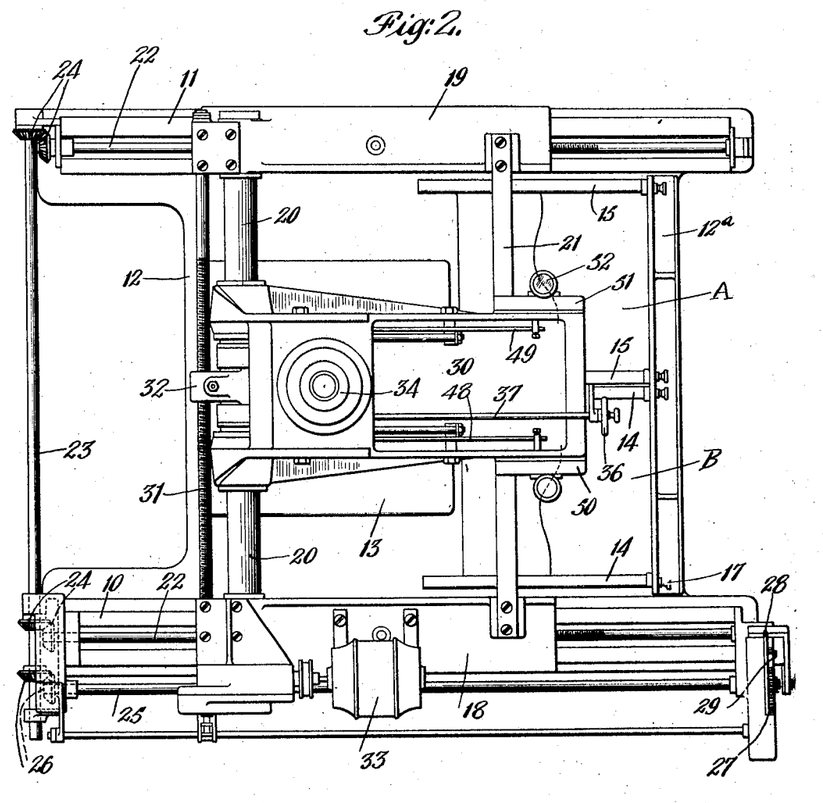
Figure 2 is a plan view of the machine.
Figure 3:
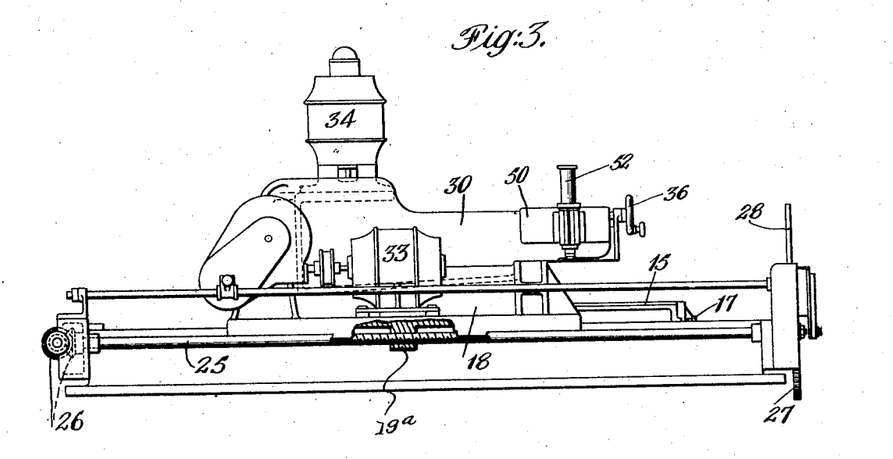
Figure 3 is a side elevation.
Figure 4:
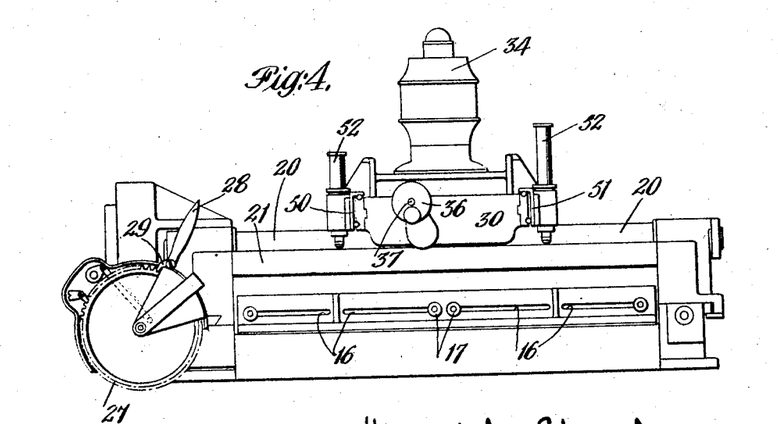
Figure 4 is an end elevation.
Figure 5:
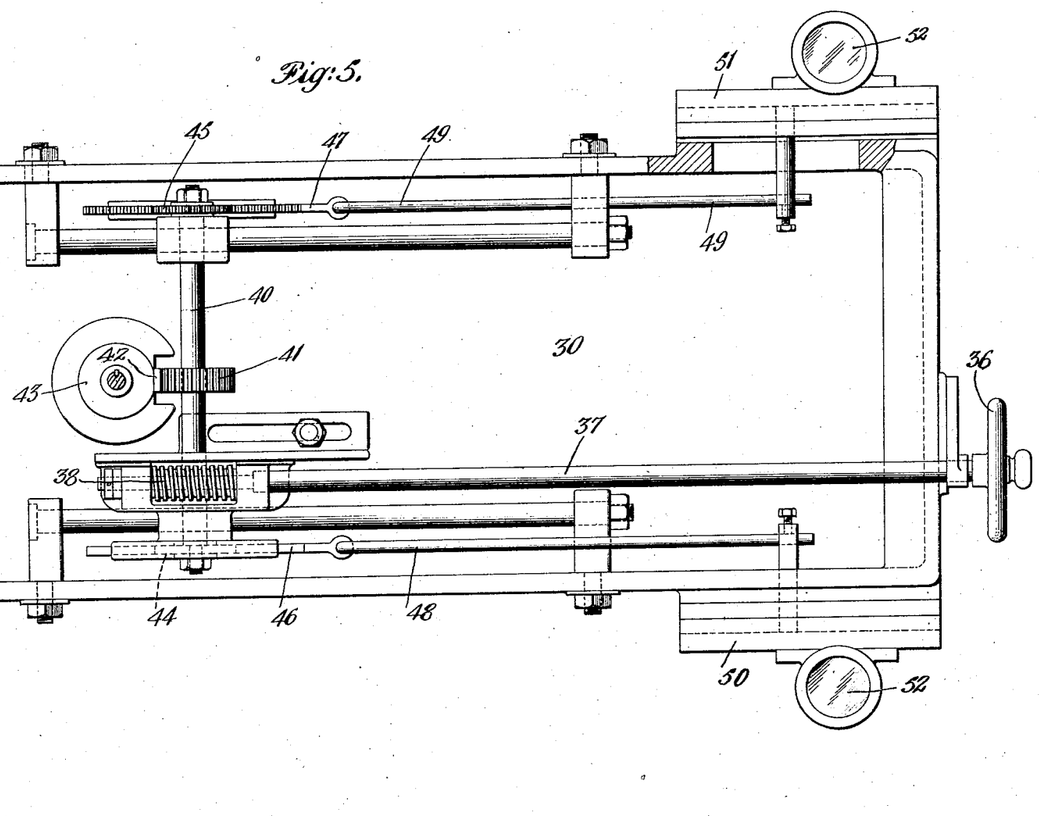
Figure 5 is an enlarged detail of the carriages.
Figures 6, 7, 8:
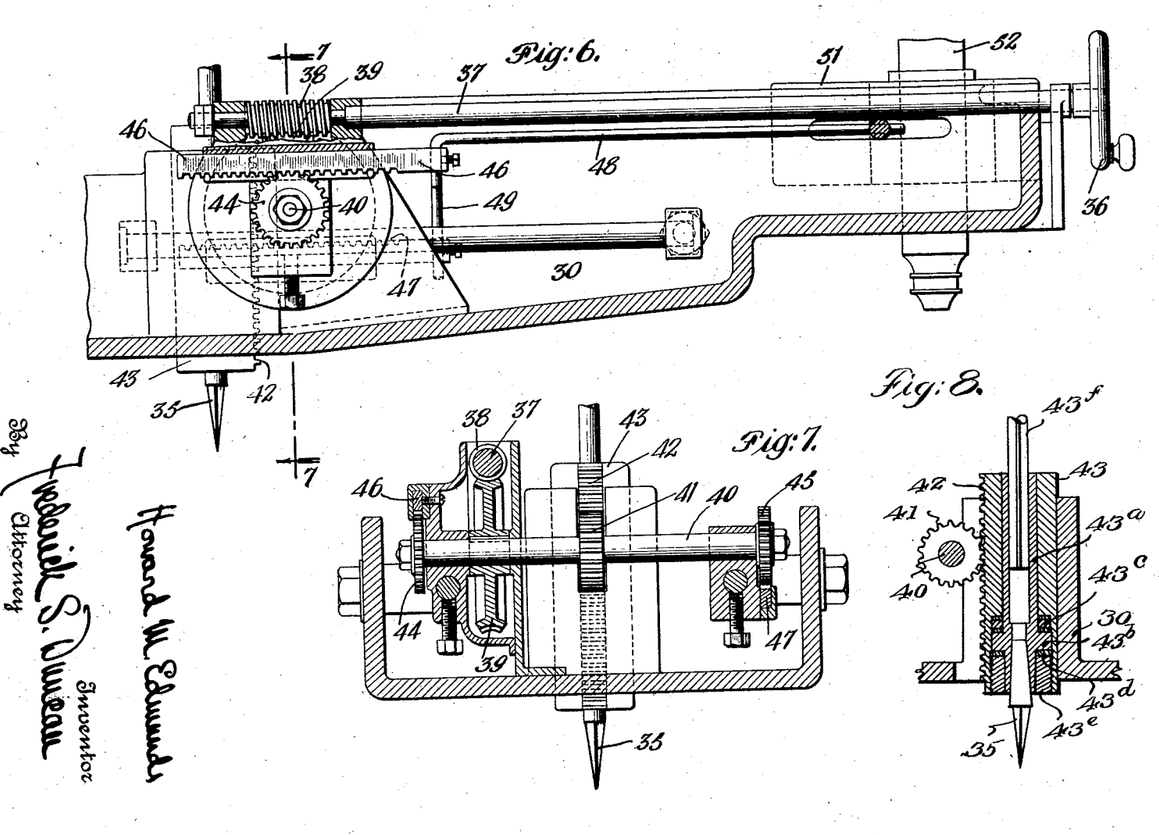
Figure 6 is a detail view showing the drill and microscope operating mechanism.
Figure 7 is a view in section on the line 7, 7 of Figure 6.
Figure 8 is a section in elevation showing how the milling cutter may be mounted and operated in its carrier.

A plan view of a suitable machine for utilizing a single plate or complementary plates is shown in Figure 2. The moving parts are supported by a stationary bed plate having two side and parallel members 10, 11 and connecting members 12 and 12ª. The block of material 13 to be carved is placed between the members 10, 11 and is rigidly secured in position. The member 12ª supports a carrier for the two guide plates A and B which are shown in position and on each side of which is a portion of a distorted or contour line of the grid. The guide plates A and B are placed in their carriers in the carving machine, positioned as shown in Figure 1 with the equally spaced and parallel straight lines parallel to the direction of cross traverse of the milling cutter and microscopes hereinafter referred to. The carrier may comprise two pairs of members 14 and 15, the front ends of each of which are designed to take a bearing on the member 12ª of the bed plate. This member 12ª has a plurality of horizontal slots 16, through each of which projects a screw threaded pin 17, 17 on the members 14 and 15. Each pin 17 carries a nut, and these nuts, when screwed up against the member 12ª, to hold the members 14 and 15 in position. The pin and slot connection of the members 14 and 15 with the member 12ª admits of separate and individual adjustment of the guide plates. Mounted on the side members 10, 11 of the bed plate, and movable along the same by gearing are two slides 18, 19 connected together so that they move as one by a rod 20 which is perferably of circular section and a cross bar 21. Each of the side members 10, 11 of the bed plate has a screw threaded shaft 22, mounted therein and engaging a non-rotatable nut 19ᴬ carried by each of the slides 18 and 19 mounted on the member 10 and member 11 respectively. The two shafts 22 are geared together by a cross shaft 23 and bevel gearing 24. In the side member 10 of the bed plate, a second shaft 25 is mounted and is geared by bevel gearing 26 to the cross shaft 23. The shaft 25 also carries a ratchet wheel 27 and is advanced in a step by step manner by handle 28, carrying a pall 29. When the handle 28 is actuated, the shaft 25 is rotated and through the gearing 26 cross shaft 23 and gear 24 imparts rotary motion to the shafts 22. The rotation of the shafts 22 moves the connected slides 18, 19 simultaneously along the side members 10, 11. Mounted on the rod 20 so as to be movable longitudinally thereof is a frame 30 which also rests on the cross bar 21. The members 18, 19, 20 and 21 constitute one carriage and the member 30 constitutes another carriage superimposed thereon. The first mentioned carriage has a longitudinal movement and the last mentioned carriage has a transverse movement at right angles. One of the movements of the carriage has been described and the other movement is effected by a screw threaded shaft 31 mounted at its ends in the members 18, 19 and meshing with a non-rotatable nut contained in an extension 32 of the frame 30. The shaft 31 is geared to an electric motor or other prime mover 33 mounted on the member 18. When the shaft 31 is driven, the frame 30 is traversed across the bed plate and the motor 33 is preferably so controlled that the movements of the carriage in one direction are quicker than those in the other. The frame 30 carries an electric motor or other prime mover 34 which carries the milling cutter 35 which is disposed vertically, and the mounting of which is such that it can be moved towards or away from the work 13. The movements of the drill are effected by a hand wheel 36 and shaft 37. On the shaft 37 is a worm 38 that meshes with a worm wheel 39 mounted on a shaft 40. The shaft 40 carries a pinion 41 which meshes with a rack 42, constituted on the member 43 through which the milling cutter 35 extends. The member 43 is such that the milling cutter is raised and lowered therewith, its rotary movement not being interfered with during such movements. A convenient construction for permitting longitudinal movement of the milling cutter independently of its actuating means, is illustrated in Figure 8. The member 43 may be provided with a chuck 43ª having the flanges 43ᵇ, which turn against a suitable upper thrust bearing 43ᶜ, and a suitable lower thrust bearing 43ᵈ, the lower thrust bearing being retained, if desired, by means of the threaded collar 43ᵉ. The motor shaft 43ᶠ may be splined so that it will slidably or non-rotatably operate in the bore of the chuck 43ª and thus permit the milling cutter to be raised and lowered without interfering with its rotation, and independently of the motor. Mounted at the ends of the shaft 40 are pinions 44 and 45. The pinion 44 gears with the rack 46 and the pinion 45 with the rack 47. The rack 46 is connected by rod 48 and the rack 47 by rod 49 with slides 50, 51 mounted on the exterior of the frame 30 above the guide plates 14. Each of the slides 50, 51 carries a microscope 52. As the frame 30 is traversed across the bed plates, the operator keeps the cross hairs of one or the other of the microscopes above one of the contour lines of the grid by rotating the hand wheel 36 in appropriate directions. The rotation of the hand wheel 36 also acts on the drill to be raised or lowered in relation to the work 13. The rack 46 gears with the upper side of the pinion 44 and the rack 47 with the lower side of the pinion 45. Consequently when the hand wheel 36 is rotated, the slides 50, 51 move simultaneously in to a like extent but in opposite directions. The movements of the microscopes which are in a horizontal direction correspond in distance to the vertical movements of the milling cutter, or bear a definite relationship thereto. The guide plates A and B are mounted in the carrier so that the undistorted or base lines of the system of equally spaced and parallel straight lines are parallel with the movements of the frame 30 across the bed plate and are at right angles to the motion of the carriage effected by rotation of shaft 25. Shaft 25 is rotated to adjust the microscopes and milling cutter in relation to the guide plates so as to bring the cross hairs of the microscopes above any desired line.

The operator can work with either of the microscopes but selects the guide plate which shows best the particular line he is carving.

The degree of relief depends upon the relative distance of the cameras to the projector and the projector to the screen. In cases where this distance is great it will be convenient to place the cameras with their lenses pointing directly towards the object and the sensitive plates at right angles to the optical axes of the lenses. In such cases, the photographs cannot be used as guide plates, but must be corrected in the well-known manner in an enlarger so as to secure a pair of guide plates identical with those which would have been obtained had the cameras been placed so that the optical axes of their lenses were parallel with that of the projector and at right angles to the design and the sensitive plates and transparency perpendicular to the axes of their respective lenses. The milling cutter movements may be made a fixed proportion of the microscope movement, for instance, by altering the pitch diameter of the pinion 14. By this means the degree of relief of the carving may be altered.

When producing or reproducing copies in intaglio, the guide plates are placed in the carving machine in the same positions as for relief carving, except that each is rotated through 180° about an axis lying in the plane of the plate.

The transposition of the guide plates, that is, the placing of the plates taken in the left hand and right hand cameras in the positions normally occupied by those taken in the right hand and left hand cameras respectively enables copies to be produced or reproduced which are reversed from right to left. This applies equally to relief or intaglio carving.

Having thus described my invention and with the knowledge that changes and modifications may be made which will nevertheless come within the spirit and scope thereof as defined by the appended claims, I claim:

1. In a machine for producing three-dimensional figures from two-dimensional records of same, a guide-plate having contour lines defining the shape of a three-dimensional figure, means for supporting said guide-plate, a cutting instrument adapted to move in a direction parallel to the base lines of said plate, means adapted to trace said contour lines, means to impart longitudinal motion to said cutting instrument proportional to the distance of said contour lines from said base lines, and means for imparting a spaced step-by-step movement of the said cutting instrument through a series of successive planes parallel to each other.

2. In a machine for producing three-dimensional figures from two-dimensional records of the same, a guide-plate on which is defined contour lines representing the contour of an object to be reproduced with respect to right base lines, a carriage adapted for motion parallel to said base lines, a milling cutter supported by said carriage and adapted for motion in a plane at right angles and perpendicular to said plate, a shaft on said carriage having rack and gear connection with said milling cutter whereby said motion may be imparted, means for tracing said contour lines, said means having rack and gear connection with said shaft whereby said longitudinal motion may be imparted to said milling cutter.

3. In a machine for producing three-dimensional figures from two-dimensional records of the same, a guide-plate, means for fixedly retaining said guide-plate, a main carriage adapted for step by step motion in a plane parallel with said plate, a second carriage mounted on said main carriage, said second carriage being adapted for motion at right angles to the motion of said main carriage, a milling cutter carried by said second carriage, and means for operating said milling cutter.

4. In a machine for producing three-dimensional figures from two-dimensional records of the same, a guide-plate, means for fixedly retaining said guide-plate, a main carriage adapted for step by step motion in a plane parallel with said plate, a second carriage mounted on said main carriage, said second carriage being adapted for motion at right angles to the motion of said main carriage, a milling cutter carried by said second carriage and adapted for perpendicular motion with respect to the motion of said carriages, means for tracing a contour line on said plate, and means for causing said milling cutter to move longitudinal of itself a distance proportional to the distance of said contour line from its corresponding base line on said plate.

5. In a machine for producing three-dimensional figures from two-dimensional records of the same, a guide-plate, means for fixedly retaining said guide-plate, a main carriage adapted for step by step motion in a plane parallel with said plate, a second carriage mounted on said main carriage, said second carriage being adapted for motion at right angles to the motion of said main carriage, a milling cutter carried by said second carriage and adapted for perpendicular motion with respect to the motion of said carriages, means for tracing a contour line on said plate, means for causing said milling cutter to move longitudinal of itself a distance proportional to the distance of said contour line from its corresponding base line on said plate, and means for causing said main carriage to move step by step over said plate in a direction at right angles to the base lines thereof.

6. In a machine for producing three-dimensional figures from two-dimensional records of the same, a guide plate, means for fixedly retaining a guide-plate, said main carriage adapted for step by step motion in a plane parallel with said plate, a second carriage mounted on said main carriage, said second carriage being adapted for motion at right angles to the motion of said main carriage, a milling cutter carried by said second carriage and adapted for perpendicular motion with respect to the motion of said carriages, means for tracing a contour line on said plate, means for causing said milling cutter to move longitudinally of itself a distance proportional to the distance of said contour line from its corresponding base line on said plate, and means for causing said main carriage to move step by step over said plate.

7. In a machine for producing three-dimensional figures from two-dimensional records of the same, a guide-plate, means for fixedly retaining said guide-plate, a main carriage adapted for step by step motion in a plane parallel with said plate, a second carriage mounted on said main carriage, said second carriage being adapted for motion at right angles to the motion of said main carriage, a milling cutter carried by said second carriage and adapted for perpendicular motion with respect to the motion of said carriages, means for tracing a contour line on said plate, means for causing said milling cutter to move longitudinally of itself a distance proportional to the distance of said contour line from its corresponding base line on said plate, and means for transmitting power to said milling cutter.

8. In a machine for producing three-dimensional figures from two-dimensional records of the same, a guide-plate, means for fixedly retaining said guide-plate, a main carriage adapted for step by step motion in a plane parallel with said plate, a second carriage mounted on said main carriage, said second carriage being adapted for motion at right angles to the motion of said main carriage, a milling cutter carried by said second carriage and adapted for perpendicular motion with respect to the motion of said carriages, means for tracing a contour line on said plate, means for causing said milling cutter to move longitudinally of itself a distance proportional to the distance of said contour line from its corresponding base line on said plate, and means mounted on said second carriage and adapted to cause rotation of said milling cutter.

9. In a machine for producing three-dimensional figures from two-dimensional records of the same, a guide-plate, means for fixedly retaining said guide-plate, a main carriage adapted to travel in a plane parallel with said plate and over the same by step by step motion, a second carriage mounted on said main carriage and adapted to travel freely in a direction at right angles to the travel of said main carriage, a milling cutter mounted on said second carriage, said milling cutter being adapted for motion longitudinally of itself, means for causing said motion, said means consisting of ratchet and gear mechanism, the ratchet being adapted for operation in the plane of said plate, and means controlling said milling cutter for enabling the operator to follow the contour lines on said plate.

10. In a machine for producing three-dimensional figures from two-dimensional records of the same, a guide-plate, a milling cutter slidably mounted for longitudinal motion and provided with a rack, a gear meshing with said rack and mounted on a shaft, a second gear also mounted on said shaft, a second rack meshing with said second gear and adapted for motion at right angles to said first-mentioned ratchet, the ends of said second rack being provided with means for tracing a contour line on said guide-plate as relative motion takes place between said shaft to cause said tracing means to follow the said contour lines.

11. In a machine for producing three-dimensional figures from two-dimensional records of the same, a guide-plate, means for retaining said guide-plate, a rack bar adapted to slide in parallelism with the plane of said guide-plate, indicating means controlled by said rack for enabling an operator to keep the same in registry with the contour line of a guide-plate, a milling cutter mounted to slide in a direction at an angle to that of said ratchet, and means for imparting longitudinal motion to said milling cutter.

12. A machine of the class described, including a support for a block of material to be carved, a milling cutter mounted in operative relation to the block support and means for guiding relative movements of cutter and block support in one plane along the undistorted lines of a predetermined pattern covering the area to be fashioned, and for simultaneous movements at right angles to said plane, in combination with a pattern plate also at right angles to said first plane, said plate having thereon contour lines corresponding to said predetermined pattern but having points thereof displaced along parallel lines, means for controlling in and out movements of the cutter in exact ratio to the lengths of said parallel lines, and means for moving said carving tool through a series of spaced planes parallel to each other and parallel with said undistorted lines.

13. A machine of the class described, including a fixed support for a block of material to be carved, a milling cutter, means for guiding its movements in one plane to correspond to the lines of a predetermined pattern covering the area to be fashioned, in combination with a fixed pattern plate in a plane at right angles to said plane of motion of the cutter, said pattern plate having thereon contour lines corresponding to the same predetermined pattern but displaced by and in accordance with the contoured elevations and depressions of the object to be carved, means for guiding in and out movement of the cutter in accordance with said contour lines simultaneously with said plane movement corresponding to the predetermined pattern, and means for shifting the carving tool from one to another of a series of fixed planes parallel to each other and parallel to said plane movement.

In testimony whereof, I have signed this specification.

HOWARD M. EDMUNDS.